United States Patent [19]

Tatsumi

[11] Patent Number: 5,018,022
[45] Date of Patent: May 21, 1991

[54] FACSIMILE DEVICE FOR TRANSMITTING PORTIONS OF DOCUMENTS AND HOLDING THE TRANSMISSION PROCESS

[75] Inventor: Takashi Tatsumi, Osaka, Japan

[73] Assignee: Sharp Kabushiki Kaisha, Osaka, Japan

[21] Appl. No.: 506,524

[22] Filed: Apr. 6, 1990

Related U.S. Application Data

[63] Continuation of Ser. No. 186,578, Apr. 27, 1988, abandoned.

[30] Foreign Application Priority Data

| Apr. 28, 1987 | [JP] | Japan | 62-105615 |
| May 27, 1987 | [JP] | Japan | 62-130608 |
| Jul. 27, 1987 | [JP] | Japan | 62-188146 |
| Jul. 31, 1987 | [JP] | Japan | 62-193144 |

[51] Int. Cl.⁵ .............................................. H04N 1/32
[52] U.S. Cl. .................................... 358/431; 358/405; 358/407; 358/437; 358/441
[58] Field of Search ............... 358/400, 405, 406, 407, 358/412, 413, 431, 434, 437, 441, 497

[56] References Cited

U.S. PATENT DOCUMENTS

| 3,914,537 | 10/1975 | Perreault et al. | 358/286 |
| 4,150,873 | 4/1979 | Dali | 358/285 |
| 4,249,216 | 2/1981 | Kanda | 358/257 |
| 4,274,114 | 6/1981 | Kozima | 358/257 |
| 4,310,859 | 1/1982 | Takahashi et al. | |
| 4,338,637 | 7/1982 | Ueno | 358/288 |
| 4,502,080 | 2/1985 | Tsuda | 358/256 |
| 4,523,234 | 6/1985 | Sangu | 358/285 |
| 4,524,393 | 6/1985 | Ohzeki | |
| 4,620,781 | 11/1986 | Miyamoto | 358/285 |
| 4,631,577 | 12/1986 | Yamanishi | 358/75 |
| 4,679,093 | 7/1987 | Yaguchi | 358/293 |
| 4,689,693 | 8/1987 | Watanabe | 358/294 |
| 4,723,172 | 2/1988 | Matsumoto | 358/280 |
| 4,739,372 | 4/1988 | Watanabe | 355/8 |
| 4,768,100 | 8/1988 | Kunishima et al. | 358/293 |
| 4,899,288 | 2/1990 | Sano et al. | 358/473 |

FOREIGN PATENT DOCUMENTS

0262603  4/1988  European Pat. Off. .

Primary Examiner—Howard W. Britton
Assistant Examiner—Kim Yen Vu

[57] ABSTRACT

A facsimile device for transmitting an original document that is stationarily placed on a document scanning plate during the document transmission is provided. The device includes a sending key for initiating the transmission of the original document, an end line detecting sensor for detecting an end line of the original document being transmitted, and false signal generating units having a main control unit and a device for generating a false signal to a circuit that is used for holding the transmission in response to the detection of the end line by the end line detecting sensor. In this facsimile device, during the replacement of original documents the circuit holds the transmission by sending the false signal generated by the false signal generating units. Furthermore, an operator can transmit one or a plurality of documents in their respective desired lengths.

6 Claims, 8 Drawing Sheets

FACSIMILE DEVICE FOR TRANSMITTING PORTIONS OF DOCUMENTS AND HOLDING THE TRANSMISSION PROCESS

This application is a continuation of application Ser. No. 07,186,568 filed on Apr. 27, 1988, now abandoned.

BACKGROUND OF THE INVENTION

1. Field of the Invention

The claims of the present application generally relate to an image processing device, and more particularly, to a facsimile device for sending an image or images formed on an original document from one location to another by stationarily placing the original document on a document scanning plate of the facsimile device.

2. Description of the Prior Art

Conventionally, a facsimile device is of the type in which the transmission of an image or images that are formed on an original document is executed by moving the document with respect to an image sensing station and a plurality of documents are initially placed on a tray before the transmission. In this type of facsimile device, after one document has been transmitted, the next document is readily detected by hardware such as a switch, a photo-coupler or a similar device provided in a document path.

On the contrary, when a facsimile device if of the type in which the document is stationarily placed on a document scanning plate of the device during the transmission, the removal of one document which has already been transmitted, causes the next document to be placed on the document scanning plate for the transmission thereof. Because of this document placing process, it is difficult to detect the presence or absence of the next document. Therefore, any detecting process such as the aforementioned switch or a similar device is not usually provided in the facsimile device.

When the facsimile device does not send any transmission data for a predetermined period of time, a circuit for sending the data therethrough is generally cut off. Thereby, the circuit is occasionally cut off during the replacement of documents and, in the case where a plurality of documents are being transmitted, an operator inevitably needs to redial whenever the circuit is cut off.

Furthermore, in the image processing employed in the above described facsimile device, the amount of one scan is fixed to, for example, the length of A4 or B5-size paper in the hardware. Otherwise, the read amount for one scan of image data is limited by a mechanical stopper.

Accordingly, in conventional image processing when a certain desired length of the image is required to be read, the input of the image is stopped upon operation of a stop key or by the mechanical stopper. In either case, because the travel of an image reading sensor is hid by a document cover, the operator can not confirm the location of the image reading sensor to correctly identify the desired image of the document. Moreover, when the stop key is once depressed, the device is brought to a stop. As a result, when the same operation is required to be repeated, a start key should be depressed for every depression of the stop key. Therefore, the facsimile device employing the aforementioned image processing is disadvantageous because the operator must dial a plurality of times in a transmission process.

SUMMARY OF THE INVENTION

Accordingly, the claims of the present invention have been developed with a view for substantially eliminating the above described disadvantages inherent in the conventional facsimile device which has an original document that is stationarily placed in the device during the transmission. The essential object in the claims of the present application is to provide an improved facsimile device which uses a circuit for holding the transmission during the replacement of documents.

Another important object in the claims of the present invention is to provide a facsimile device of the above described type which is capable of transmitting any desired portion of an original document.

A further object in the claims of the present invention is to provide a facsimile device of the above described type which is simple in construction, is stable in functioning, and is readily manufactured at a low cost.

In accomplishing these and other objects, a facsimile device according to one preferred embodiment of the present invention includes a sending key for initiating the transmission of the original document, an end line detector for detecting an end line of the original document being transmitted, and a false signal generator for generating a false signal to a circuit used for holding the transmission in response to the detection of the end line by the end line detector.

By the aforementioned construction of the facsimile device, the circuit holds transmission during the replacement of original documents by sending the false signal generated by the false signal generator.

In the facsimile device of one preferred embodiment the original document is initially placed on a document scanning plate provided in the facsimile device and the transmission thereof is initiated by the operation of the sending key. Each line of an image contained in the document is successively read and encoded in the facsimile device and data thereof are sent to a circuit that is used for the transmission. When an end line of the image has been detected by the end line detector, a false signal generated by the false signal generator holds the circuit during the replacement of documents by an operator. When the next document has newly been set on the document scanning plate, the image data is again sent to the circuit upon depression of the sending key.

Accordingly, in this facsimile device which has the original document stationarily placed therein during the transmission and which is relatively cheap and simple in construction, the circuit can hold transmission for a certain period of time during the replacement of documents by sending the false signal to the circuit. Thereby, a plurality of documents can be successively transmitted from one location to another by using the facsimile device in the claims of the present invention.

In another embodiment of the present invention, a facsimile is provided for accommodating an image processing device which is capable of reading an original that is stationarily placed on a document scanning plate during the reading process. The image processing device includes an image reading sensor for reading an image formed on the original document, a pulse motor for driving the image reading sensor, a travel calculator means for calculating the amount of travel in the image reading sensor on the basis of a driving signal given by the pulse motor, a display for displaying the amount of travel calculated by the travel calculator, and a stop key for stopping the pulse motor.

By the above described construction of the image processing device, the image formed on the original document can be read in any desired length thereof upon operation of the stop key.

In this aspect, the input of the image is initiated upon operation of a start key. The image reading sensor is then caused to be moved by the operation of the pulse motor, for reading each line of the image. When the pulse motor is operated, the driving signal given thereby causes a display portion to indicate the amount of travel of the image reading sensor. When an operator has confirmed through the display portion that the image reading sensor has reached a desired location, the reading of the document set is stopped by the operation of the stop key. Thereafter, the image reading sensor returns to a primary position and is brought into a standby condition. If there are a plurality of original documents, the next document can be set so that the image formed thereon may be inputted.

Accordingly, since the reading of the image can be indicated in the display portion, the operator can transmit any desired portion of the document without inputting an undesired portion.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and in which:

FIG. 10b is a circuit diagram of the display portion of FIG. 10a.

DETAILED DESCRIPTION OF THE PREFERRED EMBODIMENT

Figure 1:
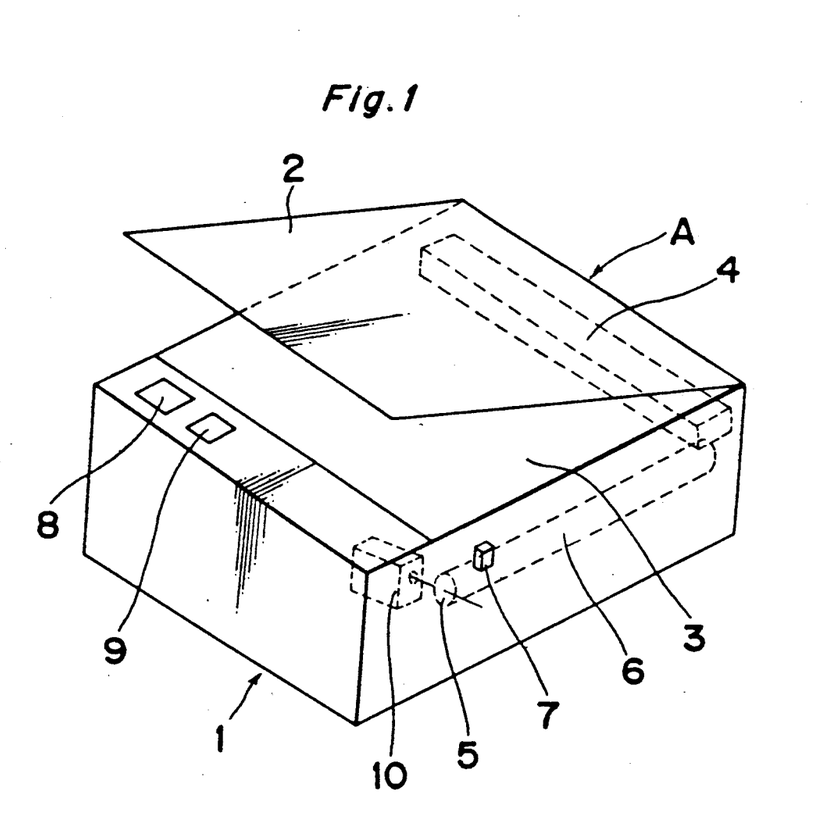
FIG. 1 is a perspective view of a facsimile device according to a first embodiment of the present invention.

Referring first to FIG. 1, a facsimile device A in a first embodiment of the present invention consists of a housing 1 and a document cover 2. A majority of the upper surface of the device housing 1 is a document scanning plate 3 that is made from a transparent plate such as glass or a similar material. The document cover 2 is connected by a hinge at one end of the device housing 1 and has a white surface on the side opposing the document scanning plate 3. The device housing 1 accommodates a scanner 4 for image reading and includes a light source and a CCD (charge coupled device) reading element. The scanner 4 is capable of reading one line of an A4-size document, for example, in a direction of the main scanning. The scanner 4 is freely movable in a longitudinal direction of the A4-sized document i.e., in a subscanning direction that is perpendicular to the direction of the main scanning. The scanner is freely movable by the operation of a conveying mechanism that includes an electric motor 10, a pulley 5 coupled to the electric motor 10, an endless belt 6 and the like. The device housing 1 is provided on one side with an end line detecting sensor 7 for detecting the end line of the document placed on the document scanning plate 3. When the scanner 4 has reached a location adjacent to the end line detecting sensor 7, the scanner 7 detects the end line of the document and generates a signal indicative of the end of the document.

It is to be noted here that the number of lines to be read may be set in advance. Under such a condition, the signal indicative of the end of a document may be generated when the predetermined number of lines of the document have been read thereof.

Figure 2:
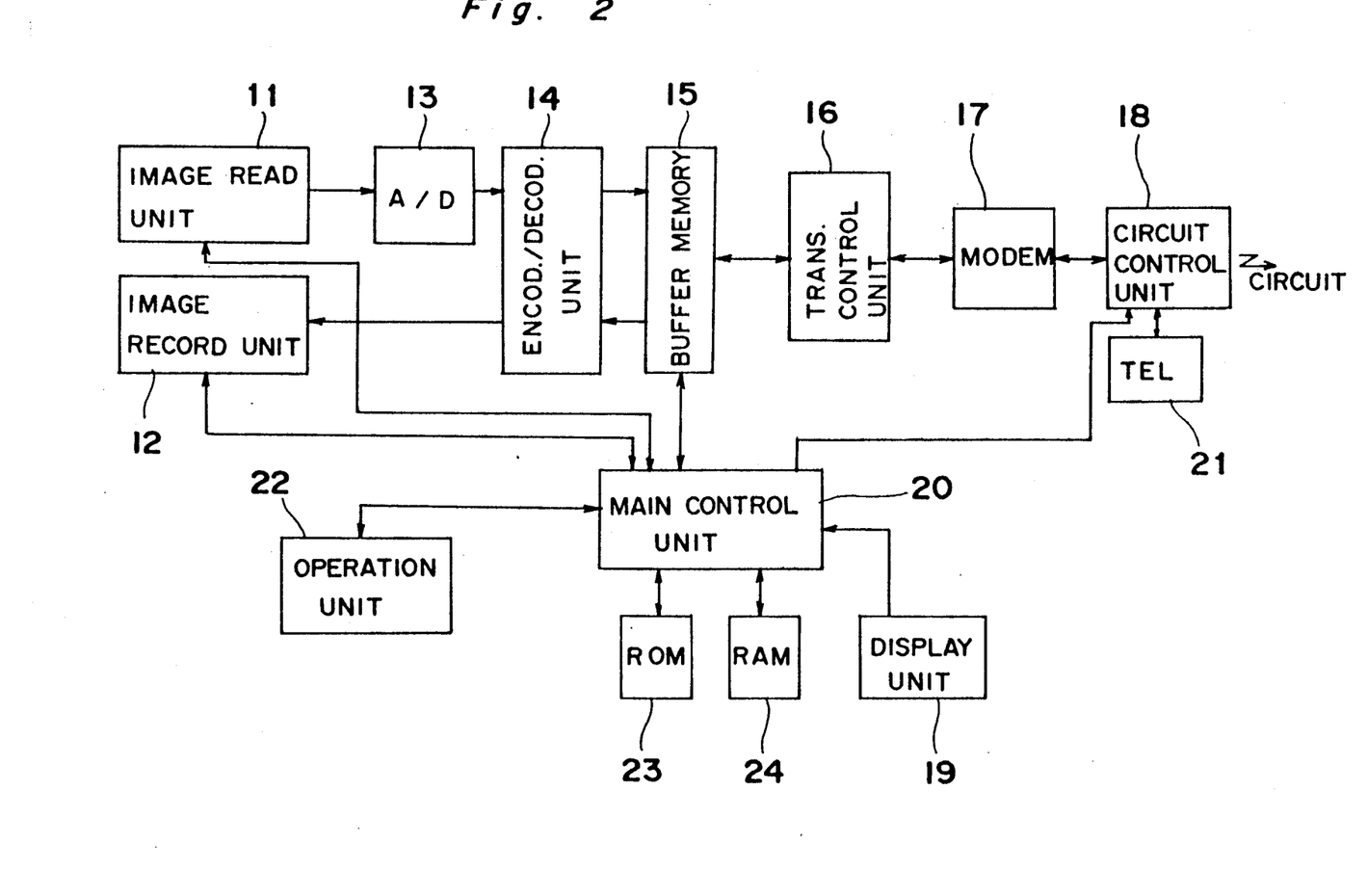
FIG. 2 is a block diagram of the facsimile device of FIG. 1.

FIG. 2 illustrates a block diagram of the facsimile device according to the first embodiment of the present invention. The device includes an image reading unit 11, an image record unit 12, an A/D converter 13, an encoding/decoding unit 14, a buffer memory 15, a transmission control unit 16, a MODEM (modulator and demodulator) 17, a circuit control unit 18, a display unit 19 containing a lamp flickering circuit, a main control unit 20, a telephone set 21, an operation unit 22 provided with a buzzer circuit, a sending key 8, and an information lamp 9, a ROM 23 and a RAM 24. The main control unit 20 is coupled to the image reading unit 11, the image record unit 12, the buffer memory 15, the circuit control unit 18, the display unit 19, the operation unit 22, the ROM 23 and the RAM 24. The image reading unit 11 is also coupled to the A/D converter 13 that is coupled to the encoding/decoding unit 14. The encoding/decoding unit 14 is also coupled to the buffer memory 15 and to the image record unit 12. The transmission control unit 16 is coupled to the buffer memory 15 and to the MODEM 17 that is coupled to the circuit control unit 18. The circuit control unit 18 is also coupled to the telephone set 21 and to the circuit used for the transmission.

The transmission is initiated by depressing the sending key 8 and an image signal that is obtained by the image reading unit 11 is converted into a digital signal by the A/D converter 13 The image signal is then encoded by the encoding unit 14 and is successively stored into the buffer memory 15 so that the encoded signal may be sent to the circuit by way of the transmission control unit 16, the MODEM 17 and the circuit control unit 18.

When a series of image data obtained by the image reading unit 11 have been completely sent, the buzzer circuit that is contained in the operation unit 22 causes the buzzer to sound and the lamp flickering circuit that is contained in the display unit 19 causes the lamp 9 to flicker. Thereby, an operator is urged to replace the document on the document scanning plate 3 by another document in order to resume the transmission by the operation of the operation unit 22. When replacing the documents, the main control unit 20 executes the control as shown in a flow-chart of FIG. 3.

Figure 3:
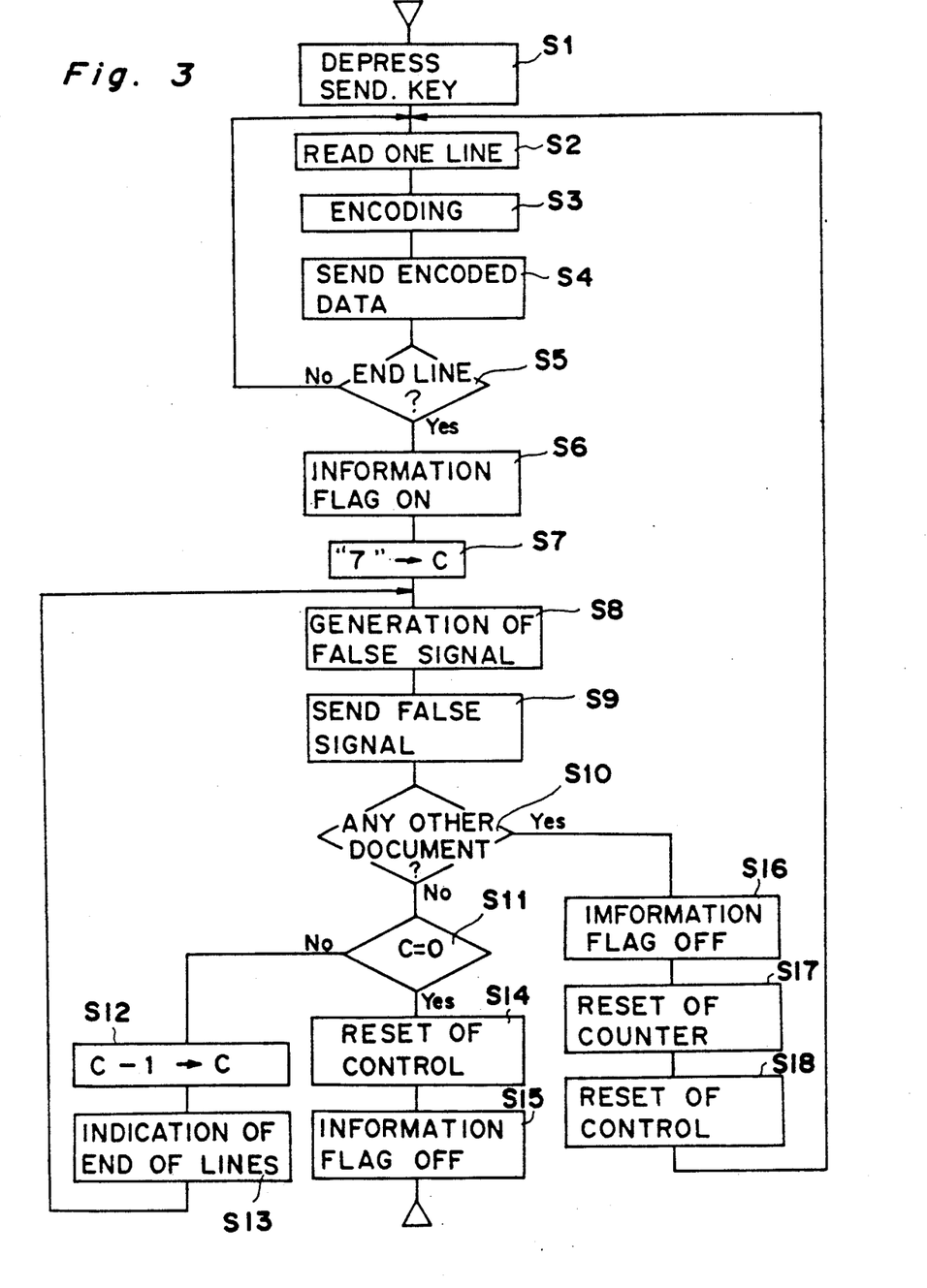
FIG. 3 is a flow-chart showing the operation of the facsimile device of FIG. 1.

More specifically, after the main control unit 20 has detected the end line of the document being transmitted, the circuit holds the transmission during the replacement of the documents. To this end, the main control unit 20 sends a false signal indicative of a predetermined number of lines in response to an end line detecting signal. The predetermined number of lines is limited in advance, for example, to seven.

Referring next to the flow-chart of FIG. 3, the operation of the facsimile device A of the present embodiment will be explained hereinafter.

The transmission is initiated by depressing the sending key 8 at step s1 and is followed by step s2 where the image of one line is read by the image reading unit 11. The data indicative of the image of one line are encoded by the encoding unit 14 at step s3 and is followed by step s4 where the encoded data are sent to the circuit. At step s5, the end line detecting sensor 7 determines whether or not the line data obtained by the image reading unit 11 indicate the end line. If the line data do not indicate the end line at step s5, the procedure returns to step s2 where the image data of respective lines are successively sent to the circuit. If the end line detecting sensor 7 has detected the end line, the procedure proceeds to step s6 where the scanner 4 returns to a primary position and turns an information flag on. When the information flag has been turned on, the information lamp 9 is lit up and the buzzer sounds.

The procedure then proceeds to step s7 where a counter C is initially set to "7". A false signal indicative of an unreal line is generated at step s8 and sent to the circuit at step s9 by utilizing fillbits in order to hold the circuit. Step s10 determines whether or not any other document remains to be transmitted. The determination at step s10 is executed on the basis of the presence or absence of a signal for transmitting the next document. The signal is sent by the sending key 8 into the main control unit 20. When a signal to be inputted by the sending key 8 has not been found at step s10, the procedure proceeds to step s11 where a determination is made as to whether or not a plurality of false signals corresponding to the predetermined number of the unreal lines have been sent. In this embodiment, the number of the unreal lines is initially set to the maximum value i.e., seven as described above, and this maximum value is set in advance in the counter C. Accordingly, the determination at step s11 is based on whether the value in the counter C has become zero.

In the case where the counter C does not reach the predetermined number of unreal lines, the value in the counter C is subtracted by one at step s12 and is followed by step s13 where the signal that is indicative of the end of lines is sent and the procedure returns to step s8. Upon detection of the end line, the lighting of the information lamp 9 and the sound of the buzzer signals the operator to replace the documents. If a sending key 8 is not input, a plurality of false signals are successively sent by way of a closed routine as shown by steps 8, 9, 10, 11, 12, 13 and 8. At step s11, when the counter C has reached the predetermined number (when the value in the counter C has become zero) the procedure proceeds to step s14 where a signal that is indicative of the control reset is sent for terminating the transmission, and the information flag is rendered off at step 15.

On the other hand, when step s10 determines that the transmission has been ordered by the operation of the sending key 8 until the counter C reaches the predetermined number, the procedure proceeds to step s16 at where the information flag is rendered off. The counter C is reset at step s17 and the signal that is indicative of the reset control is sent at step s18 to execute the flow required for transmitting the next document. The above described operation is henceforth repeated.

It is noted that CCITT (International Telegraph and Telephone Consultative Committee) recommends that steps s13, s8 and s9 be completed within 5 seconds so that the number 7 in the counter C corresponds.

It is also noted that in this embodiment, although 7 is set in the counter C, the number of unreal lines to be initially set in the counter C may be varied by controlling the number of the fillbits (false signal) at step s9.

It is further noted that although the A4-sized document is designated in the above described embodiment, the document is not limited to this size.

Figure 4:
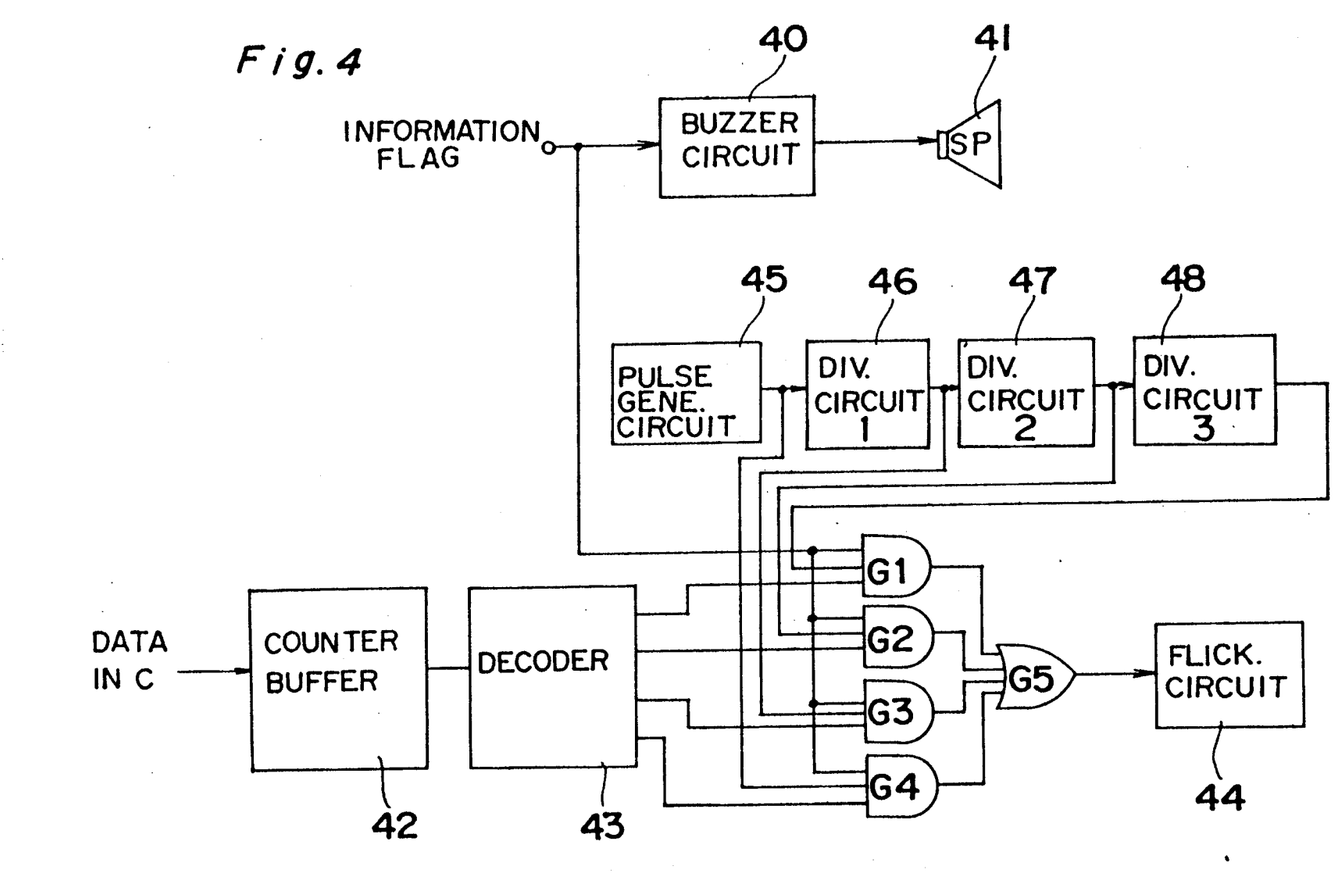
FIG. 4 is a block diagram showing one example of information device that is provided in the facsimile device of FIG. 1.

FIG. 4 depicts one example of an information device where the state of the information flag is inputted into a buzzer circuit 40 that is connected with a speaker 41 so that the buzzer may sound by way of the speaker 41. In this information device, the value in the counter C is loaded into a counter buffer 42 whenever the value has been altered. The value in the counter buffer 42 is inputted and decoded in a decoder 43. The decoder 43 is connected to four AND gates G1 to G4 for rendering either one of gates G1 to G4 effective. An output from each AND gate is inputted into an OR gate G5 that is connected to a lamp flickering circuit 44 for controlling the flickering of the information lamp 9. The information device contains a flickering pulse generating circuit 45 for generating a flickering pulse to actuate the information lamp 9. The flickering pulse generated in the flickering pulse generating circuit 45 is inputted into a first dividing circuit 46 and into the AND gate G4. An output from the first dividing circuit 46 is inputted into a second dividing circuit 47 and into the AND gate G3. An output from the second dividing circuit 47 is inputted into a third dividing circuit 48 and into the AND gate G2. The third dividing circuit 48 outputs a flickering pulse having the longest period into the AND gate G1.

Accordingly, as the value in the counter C approaches zero, the decoder 43 is switched from the AND gate G1 towards the AND gate G4 so that the flickering period may be gradually shortened.

Figure 5:
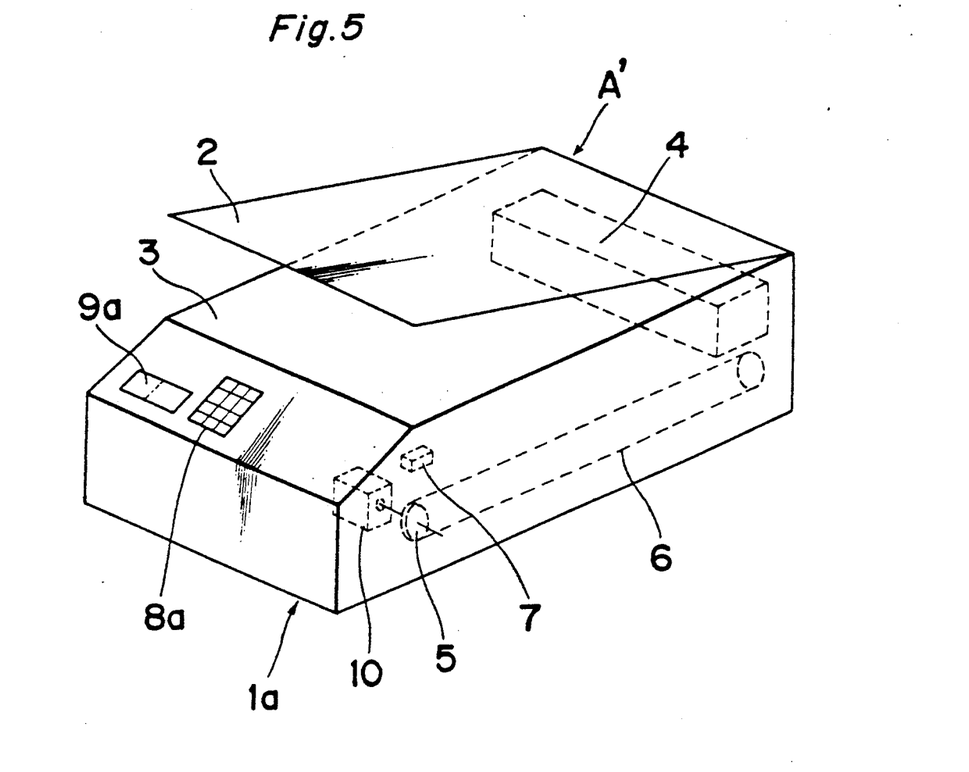
FIG. 5 is a view similar to FIG. 1, which particularly shows a modification thereof.

FIG. 5 is a second embodiment of the present invention which depicts a modification A' of the facsimile device A in the first embodiment of the present invention. The modification is provided with an operation panel 8a which has a sending key, ten number keys and a display panel 9a.

In the facsimile device A' of FIG. 5, the number of documents can be initially set by using the ten number and can be indicated in the display panel 9a. In this case, the RAM 24 is provided with a page register for storing therein the number of documents to be set and a counter C' for counting the number of documents which have already been transmitted. The construction of this modification is substantially the same as that of the first embodiment described above. When replacing documents, the main control unit 20 executes the control as shown in the flow-chart of FIG. 6.

Figure 6:
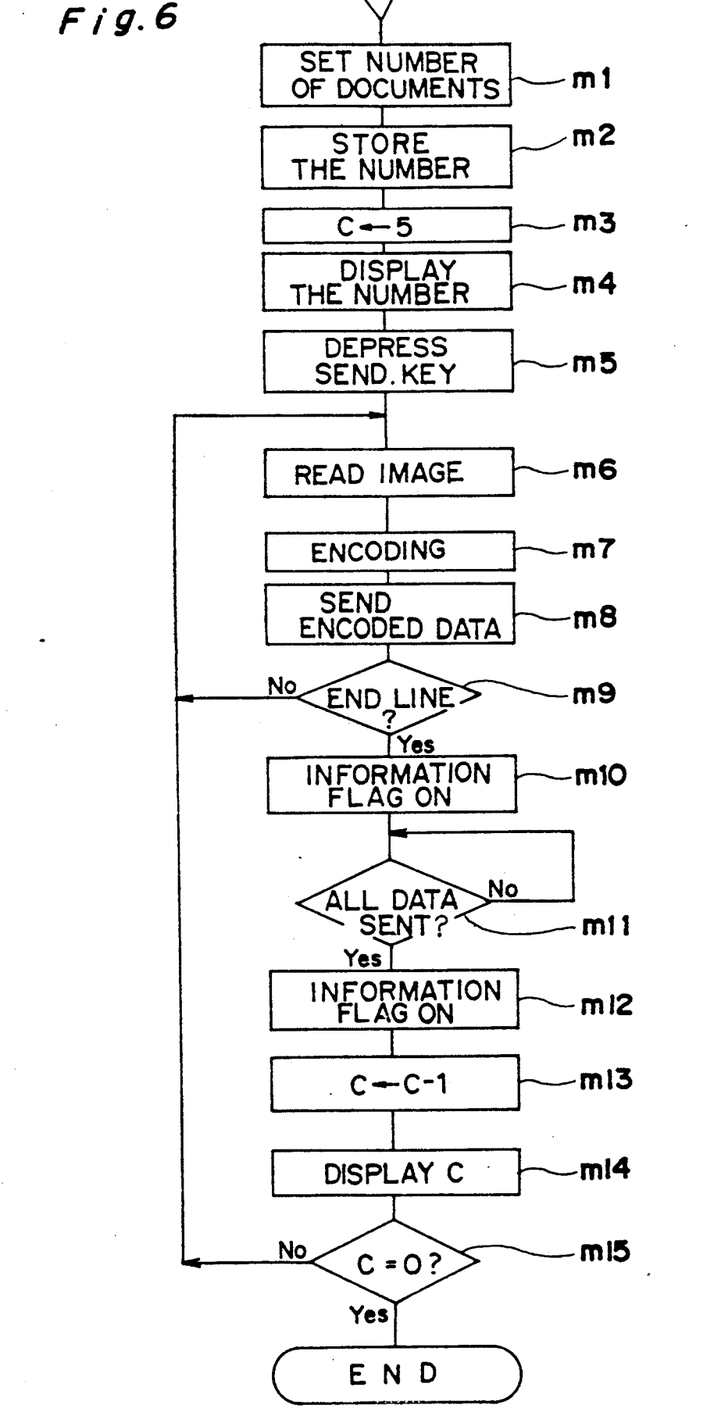
FIG. 6 is a flow-chart showing the operation of the facsimile device of FIG. 5.

More specifically, after the main control unit 20 has detected the end line of a document to be transmitted, the information flag is turned on for replacing documents. The information flag actuates the buzzer circuit and the lamp flickering circuit that is contained in the operation unit 22 and the display unit 19, respectively.

Upon completion of the transmission of the image data stored in the buffer memory 15, the number of documents set in advance is subtracted by one so that the transmission may be resumed.

In the flow-chart of FIG. 6, the number of documents to be transmitted, for example, 5 is initially set at step m1 by using the ten number provided in the operation panel 8a and the number is stored into the register at step m2. The content of the page register is inputted into the counter C' at step m3 and is followed by step m4 where the number stored in the page register i.e., 5 is indicated in the display panel 9a. A signal for transmitting the document is inputted at step m5 by depressing the sending key so that the transmission may be sequentially executed. At step m6, an image of one line of the document is read by the image reading unit 11. Data obtained by the image reading unit 11 are encoded by the encoding unit 14 at step m7 followed by step m8 where the encoded data are sent to the circuit through the buffer memory 15, the transmission control unit 16, the MODEM 17 and the circuit control unit 18.

Step m9 determines whether or not the data obtained by the image reading unit 11 is an end line. This determination is executed on the basis of an output from the end line detecting sensor 7. If the judgment at step m9 is "NO", the procedure returns to step m6 so that the data indicative of respective lines of the document may be successively sent to the circuit. When the end line detecting sensor 7 has detected the end line at step m9, the procedure proceeds to step m10 where the scanner 4 returns to the primary position and with the information flag is turned on. When the information flag has been turned on, the information lamp provided in the display panel 9a is lit up and the buzzer provided in the operation unit 22 sounds to signal the operator to replace the documents. The data of images which have already been encoded are once stored in the buffer memory 15 for the purpose of keeping sufficient time for the replacement of documents. If the end line is detected at step m9, the information flag is turned on at step m10 sending the encoded data remaining in the buffer memory 15. When all of the data in the buffer memory 15 have been completely sent to the circuit at step m11, the information flag is turned off at step m12 for stopping the lighting of the information lamp and the sound of the buzzer. At step m13, the number stored in the page register is subtracted by one and, the value obtained by the subtraction is displayed in the display panel 9a at step m14. Step m15 determines whether or not the value in the page register is equal to zero. If the value in the page register is not equal to zero, the procedure returns to step m6 where the aforementioned operation is repeated. If the value in the page register is equal to zero, that all of the documents are determined to have already been transmitted to the circuit and the procedure ends.

Figure 7:
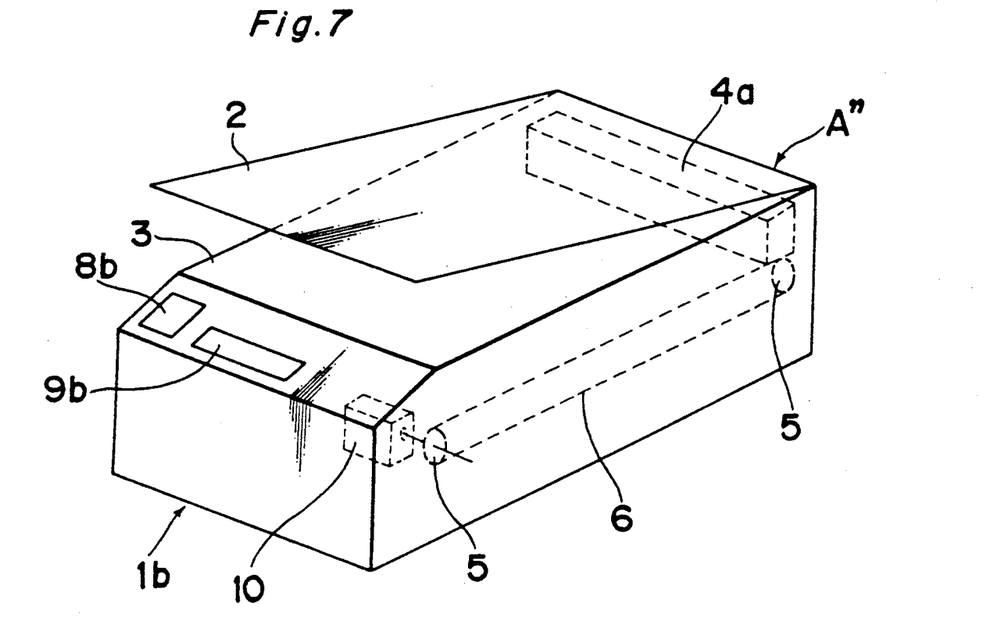
FIG. 7 is a perspective view of an image processing device according to a second embodiment of the present invention.

Referring next to FIG. 7, a second embodiment of the present invention will be explained hereinafter with respect to an image processing device which can be employed in the facsimile device.

As in the first embodiment, the image processing device A" according to the second embodiment of the present invention consists of a housing 1b and a document cover 2. The majority of an upper surface of the device housing 1b is a document scanning plate 3 that is made up of a transparent plate such as glass or similar material. The document cover 2 is connected by a hinge at one end with the device housing 1 and has a white surface on the side opposing the document scanning plate 3. The device housing 1b accommodates an image reading sensor 4 that includes a light source and a CCD reading element for reading one line of an A4-size document, for example, in a direction of the main scanning. The image reading sensor 4a is free to move in a longitudinal direction of the A4-sized document i.e., in a direction of the subscanning perpendicular to the direction of the main scanning. The image sensor 4a moves the operation of a conveying mechanism that includes an electric motor 10, a pulley 5 coupled to the electric motor 10, an endless belt 6 and similar devices. The electric motor 10 is a pulse motor type so that a driving signal can be obtained in compliance with the travel of the image reading sensor 4a. An operation panel 8b and a display panel 9b are provided on an upper surface of the device housing 1b at a readily accessible location. The operation panel 8b includes a start key and a stop key respectively for starting and stopping the image reading sensor 4a so that the display panel 9b displays the amount of travel of the image reading sensor 4a.

Figure 8:
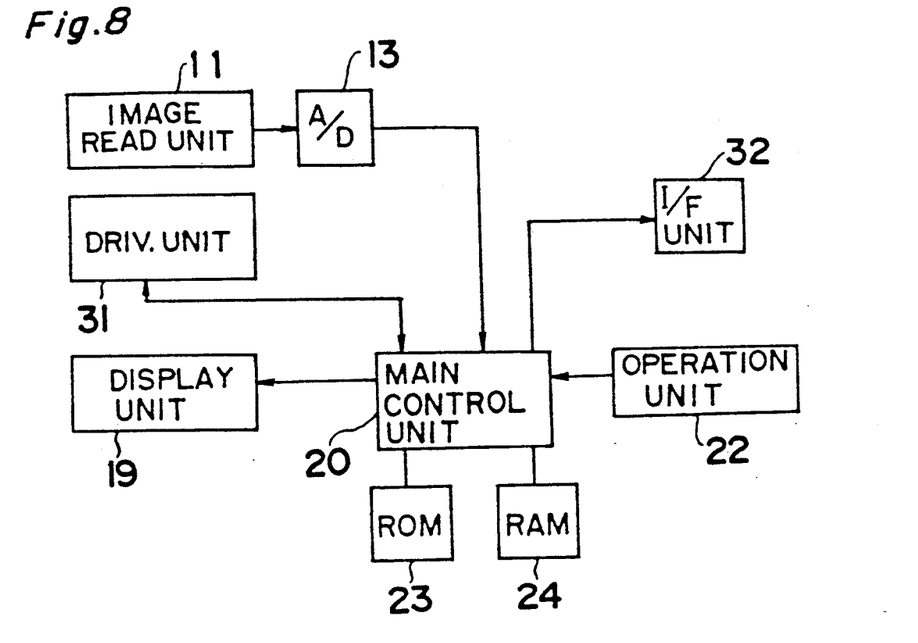
FIG. 8 is a block diagram of the image processing device of FIG. 7.

FIG. 8 is a block diagram of the image processing device A" according to the second embodiment of the present invention. The image processing device A" is internally provided with an image reading unit 11, an A/D converter 13, a display unit 19, a main control unit 20, an operation unit 22, a ROM 23, a RAM 24, a motor driving unit 31 and an I/F (Interface) unit 32. The main control unit 20 is coupled with the image reading unit 11 through the A/D converter 13, and the main control unit 20 is also coupled with the display unit 19, the operation unit 22, the ROM 23, the RAM 24, the motor driving unit 31 and the I/F unit 32.

In FIG. 8, an image signal obtained by the image reading unit 11 is converted into a digital signal by the A/D converter 13 and the converted signal is then inputted into the main control unit 20 for sending to other devices by way of the I/F unit 32.

When the motor driving unit 31 for moving the image reading sensor 4a of the image reading unit 11 has been operated, the unit outputs the driving signal into the main control unit 20 and the amount of travel of the image reading sensor 4a is displayed by the display unit 19. The ROM 23 is provided for storing various control programs therein.

Figure 9:
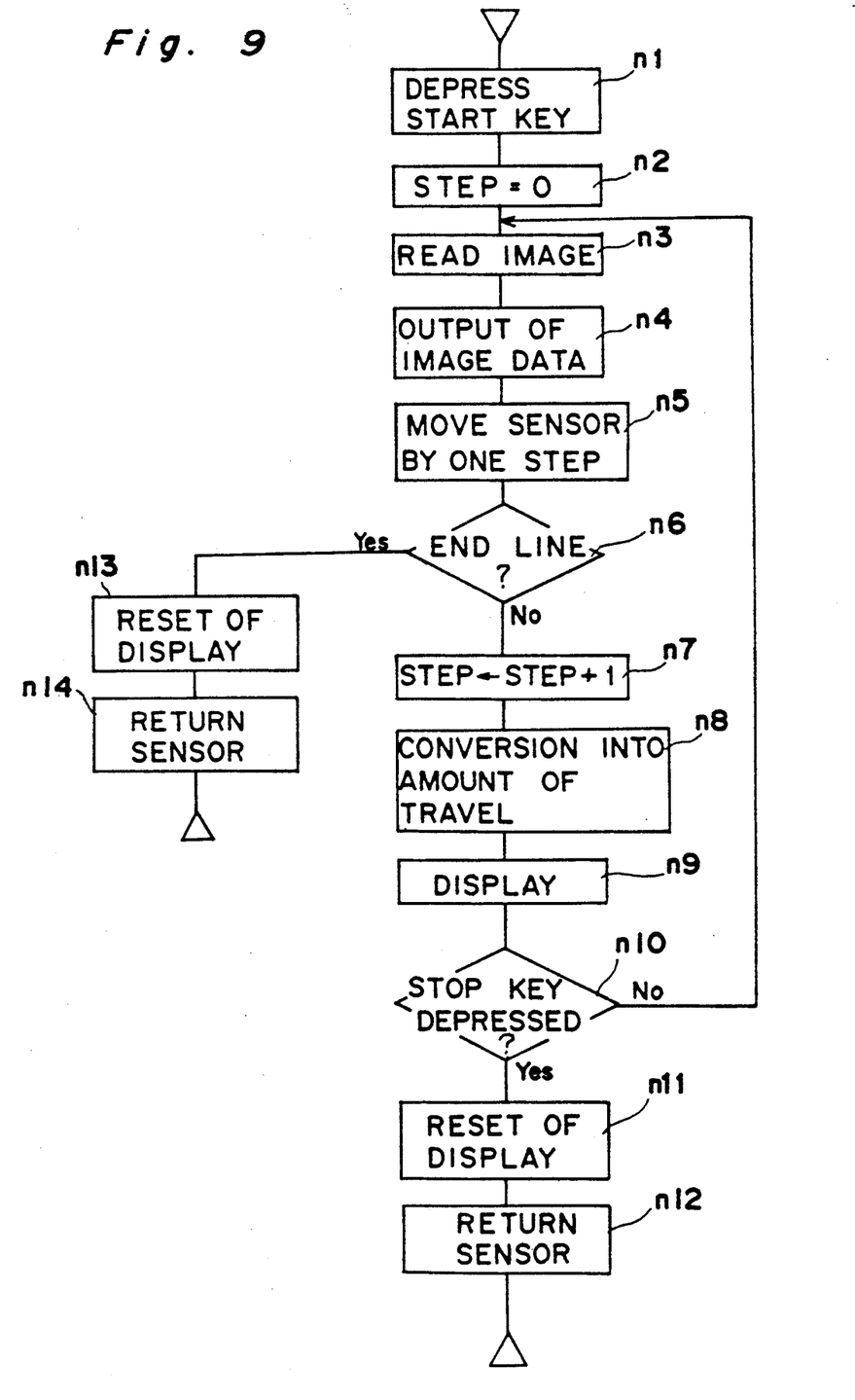
FIG. 9 is a flow-chart showing the operation of the image processing device of FIG. 7.

With reference to the flow-chart shown in FIG. 9, the operation of the image processing device A" of the present embodiment will be explained hereinafter.

Reading an image or images formed on a document is initiated by depressing the start key at step n1 and is followed by step n2 where a STEP register is initialized to zero. One or a plurality of lines of image data are successively read by the image reading sensor 4a at step n3 and the image data is converted into digital data by the A/D converter 13 for inputting into the main control unit 20. The image data are then sent to other outside devices through the I/F unit 32 at step n4 and is followed by step n5 where the image reading sensor 4a moves by one step in a direction of the subscanning by the motor driving unit 31. In the case where the image reading sensor 4a has scanned all the lines which have been set in advance, the display unit 19 is reset at step n13. Thereafter, the image reading sensor 4a returns to the primary position at step n14 and is brought into the stand-by condition. If the end line is not detected at step n6, the procedure proceeds to step n7 where one is added to the counter of the STEP register. The value in the counter is converted into the amount of travel at step n8 and is displayed in the display unit 19 at step n9. Step n10 determines whether or not the stop key has been depressed. If the stop key has been depressed at step n10, the procedure proceeds to step n11 where the input of image is brought to a stop and the display unit 19 is reset. At step n12, the image reading sensor 4a returns to the primary position and is brought into the stand-by condition. If step n10 determines that the stop key has not been depressed, the procedure returns to step n3 so that the above described operation may be repeated.

Under the stand-by condition during the transmission of a plurality of documents, the next document is set and the above described operation is repeated upon depression of the start key. If no documents remain, the stand-by condition is released upon depression of the stop key. In this event, the stand-by condition may be automatically released unless the input by the start key has been done after a predetermined period of time elapses.

Figure 10A:
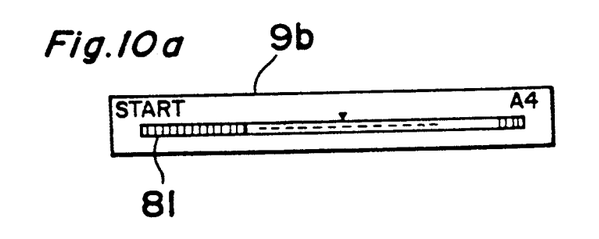
FIG. 10a is a top plan view of a display portion that is provided in the image processing device of FIG. 7.

FIG. 10a illustrates one example of the display panel 9b. The display panel 9b indicates the length of a document transmitted and includes of display elements 81 that is a series of light emitting diodes being arranged side by side. At suitable locations of the display panel 9b, word "START", a mark "A4" and the like for clearly indicating the length of the document. The display elements 81 are lit up in compliance with the location of the image reading sensor 4a.

Figure 10B:
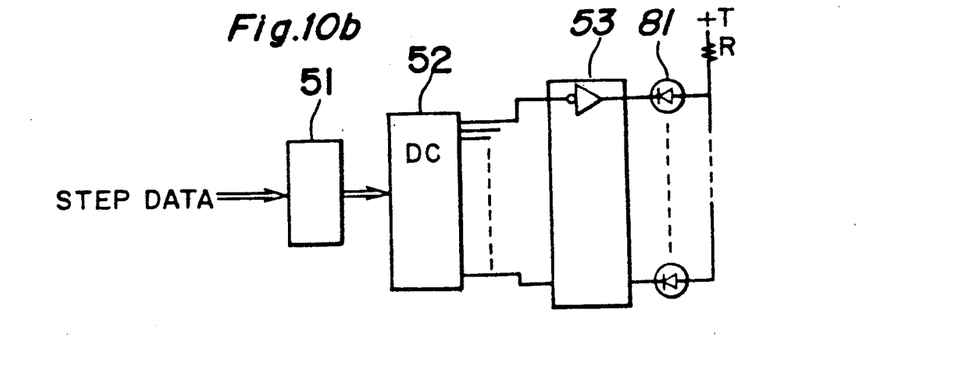

FIG. 10b illustrates one example of a circuit that is contained in the display panel 9b.

In FIG. 10b, the value in the counter of the STEP register is stored in a buffer 51. The output of the buffer 51 decoded by a decoder 52 for actuating a driver 53 so that the light emitting diodes 81 are lit up in compliance with the value in the counter.

It is noted that the data in the buffer 51 may be displayed by a numerical value that is indicative of the length after it has been converted into the numerical value.

It is also noted that although this embodiment has been described so far with respect to the image processing device, it is applicable to the facsimile device, as in the first embodiment. In other words, the image data read by the image reading sensor may be sent to other facsimile devices by way of a telephone circuit. Upon the completion of reading a document having a certain length, when the device has been brought into the stand-by condition by the operation of the stop key, the next document, if there are more than one documents, can be successively transmitted by the operation of the start key.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A facsimile device for transmitting a plurality of original documents to a receiving station via a telephone circuit, the facsimile device comprising:
   a document scanning plate for stationarily positioning one of the plurality of original documents during a transmission process;
   sending means for initiating transmission by the facsimile device of said one original document;
   reading means for reading image data contained in said one original document and for generating an output signal upon initiating transmission of a document;
   converting means for converting said image data to digital image data;
   transmission means for transmitting said digital image data converted by said converting means to the receiving station;
   end line detecting means for detecting an end line of said one original document being read;
   completion code data generating means for generating completion code data indicative of the presence or absence of a subsequent document to said one original document to be sent;
   false fillbit data signal generating means for generating a false fillbit data signal having a plurality of full-white lines or full black lines to said transmission means in response to detecting said end line of said one original document by said end line detecting means;
   judging means for judging which of said completion code data or an output signal from said sending means is outputted earlier; and
   control means for disconnecting the telephone circuit when said judging means judges that said completion code data is outputted earlier than said output signal from said sending means and for returning to operation of said reading means for executing said transmission process for said subsequent document when said judging means judges that said output signal from said sending means is outputted earlier than said completion code data.

2. The facsimile device as claimed in claim 1, further comprising information means for developing an information signal that indicates said one original document should be removed from said document scanning plate and said subsequent document from said plurality of original documents should be placed on said document scanning plate in response to said end line being detected by said end line detecting means.

3. The facsimile device as claimed in claim 1, further comprising:
   setting means for setting an original document number corresponding to the number of said plurality of original documents that are desired to be successively transmitted;
   number detecting means for detecting a transmitted document number corresponding to said plurality of documents that have been transmitted by said transmission means; and
   comparing means for comparing said original document number set by said setting means with said transmitted document number detected by said number detecting means and disabling said transmission process when said original document number equals said transmitted number, whereby said plurality of documents are successively transmitted by said original document numbers set in advance by said setting means.

4. A facsimile device having an image processing device for reading a plurality of original documents comprising:
   a document scanning plate for stationarily positioning one of the plurality of original documents to be read;
   image reading means for reading an image formed on said one original document;

driving means for driving said image reading means to read said one original document and developing a driving signal representative of a travel distance by said image reading means;

calculating means for continuously calculating said travel distance of said image reading means in response to said driving signal;

display means for displaying said amount of travel from said calculating means; and stop means for stopping said driving means in response to an activation by an operator;

said stop means allowing the operator to have only a desired portion of said image on said one original document to be read and transmitted.

5. The facsimile device as claimed in claim 4, wherein said driving means comprises a pulse motor.

6. A method for continuously transmitting a plurality of original documents by a facsimile device to a receiving station via a telephone circuit, comprising the steps of:

(a) stationarily positioning one of the plurality of original documents on a document scanning plate during a transmission process;

(b) initiating transmission by the facsimile device of said one original document and generating an output signal output initiating transmission of a document;

(c) reading image data contained in said one original document;

(d) converting said image data to digital image data;

(e) transmitting said digital image data to the receiving station;

(f) detecting an end line of said one original document being read;

(g) generating completion code data indicative of the presence or absence of a subsequent document of said one original document to be sent;

(h) generating a false fillbit data signal having a plurality of full-white lines or full-black lines in response to detecting said end line;

(i) judging which of said completion code data or an output signal from said step (b) is outputted earlier;

(j) disconnecting the telephone circuit when said completion code data is judged to be outputted earlier than said output signal at said step (i); and (k) repeating said steps (c)–(i) for said subsequent document when said output signal is judged to be outputted earlier than said completion code data at said step (i).

* * * * *